SR

OR 3,838,904

T 3044D ✓
X 3053R ✓

United States Patent

[11] 3,838,904

[45] Oct. 1, 1974

Takeda et al.

[54] HOLOGRAM PRODUCING APPARATUS WITH RANDOM OBJECT BEAM SAMPLING

[75] Inventors: Yasutsugu Takeda, Kokubunji-shi; Yoshito Tsunoda, Suginami-ku; Masaru Matsumura, Kokubunji-shi, all of Japan

[73] Assignee: Hitachi, Ltd., Tokyo, Japan

[22] Filed: Mar. 13, 1973

[21] Appl. No.: 340,883

[30] Foreign Application Priority Data

Mar. 13, 1972 Japan ............................... 47-25634

[52] U.S. Cl. ............................ 350/3.5, 350/162 SF

[51] Int. Cl. ......................................... G02b 27/00

[58] Field of Search ........................ 350/3.5, 162 SF

[56] References Cited

UNITED STATES PATENTS 3,689,129 9/1972 Lurie ................................. 350/3.5
3,744,871 7/1973 Takeda et al. ...................... 350/3.5
3,754,814 8/1973 Leith ................................. 350/3.5

OTHER PUBLICATIONS

Caulfield, Applied Optics, Vol. 9, No. 11, Nov. 1970, pp. 2,587–2,588.

*Primary Examiner*—Ronald J. Stern
*Attorney, Agent, or Firm*—Craig & Antonelli

[57] ABSTRACT

In a hologram producing apparatus wherein an object beam modulated according to picture information and a reference beam which interferes with the object beam are caused to impinge upon a photosensitive recording medium, to thereby form a hologram, the modulated object beam is divided into a plurality of smaller beams by the use of a plate provided with a two-dimensional grating or a plurality of apertures.

13 Claims, 9 Drawing Figures

HOLOGRAM PRODUCING APPARATUS WITH RANDOM OBJECT BEAM SAMPLING

BACKGROUND OF THE INVENTION

1. Field of the Invention

The present invention relates to an apparatus wherein information such as a picture, pattern, and a character is imparted to a coherent light beam and is stored in a photosensitive medium by holography techniques. The apparatus can be utilized for producing a picture information file, such as a video package and a picture information retrieval device, which employs holography.

2. Description of the Prior Art

In general, the method of storing information in a photosensitive medium by holography techniques has excellent features as mentioned below. It has, therefore, been a significant process for providing a light memory, as follows:

1. Highly dense information can be recorded without employing an optical system of high resolution.
2. The information storing mechanism has redundancy, so that influences of flaws or any other defects on holograms are of little significance.
3. The reconstruction of a picture image can be simply obtained from holograms, and high-speed reading is possible.
4. Multiple storage is possible.
5. Both digital and analog information can be handled.

In particular, research has heretofore been vigorously conducted wherein a number of apertures provided in a light shutter are respectively opened or closed in correspondence with digital information of a "1" or a "0," whereby a light beam is subjected to two-dimensional coding in order to form a hologram by the coded beam. More particularly in a Fourier transformation holography system, in which a photosensitive medium for recording holograms is arranged at a position at which the Fourier transformation image of a pattern possessed by the light beam modulated in accordance with information to be stored appears, the area of the photosensitive medium can effectively be utilized in the storage of information, and, accordingly, the system has the advantages as mentioned below. It has, therefore, been widely adopted.

1. During reconstruction, the diffraction efficiency can be made high.
2. The storage density of information can be made high.

In a Fourier transformation type holography system, when effecting a Fourier transformation hologram from light information passing through circular apertures arrayed at fixed spacings in the form of a matrix, bright spots of sharp spectra often arise on the photosensitive medium. They cause the photosensitive medium to become saturated, and constitute noise sources. On the other hand, only parts of the photosensitive medium are used. The system has, accordingly, been disadvantageous in that the reconstruction efficiency is low.

Regarding this problem, two solutions have been attempted. The first is the so-called "out-of-focus method" in which the photosensitive medium is arranged at a position set slightly off from the Fourier transformation plane. The second is the random phase shifter method. The expression "random phase shifter method" is a general term for methods in which a random phase is imparted to an information light beam substantially uniformly across the apertures provided in the light shutter and independently of the positions of the respective round openings. By way of example, the random phase shifter is constructed in such way that a number of square apertures are arranged at random on a light shielding plane provided on a glass plate and that a transparent dielectric material is evaporatively deposited thereon into $n$ (one or more) layers.

In this manner, the method of producing the holography memory of digital two-dimensional information in which information corresponding to "1" and "0" is arrayed in the form of the matrix has substantially reached the stage of perfection. The feature of the memory production according to the holography system, however, resides in that not only digital information, but also analog information can be stored. Moreover, the demand is increasing for high-density analog information, such as picture information, and so forth. When the foregoing prior-art method is applied to transforming picture information into holograms, the following difficulties arise.

For general picture information, the spacial frequency components thereof are distributed in an extremely wide range from a high frequency $f_h$ (lines/mm) at the limit of the resolution of the naked eye to a frequency of zero or a low frequency $f_l$ (lines/mm) close to zero for the color white over the entire area as for white paper. Moreover, the state of the distribution is indefinite. The provision of a pattern for a Fourier transformation of picture information is, therefore, extremely difficult. In particular, where components in the vicinity of the low frequency $f_l$ are large in terms of energy spectrum, bright spots of very sharp spectra in the form of the delta function are generated at the center at the optical axis when the Fourier transformation method is adopted.

To solve the problem by the out-of-focus method as previously discussed, it is necessary to expand the spacing between the Fourier transformation plane and the plane of the photosensitive material to an extreme degree. Disadvantageously, this significantly lowers the storage density and damages the redundancy of the hologram. For this reason, there has not been any decisive apparatus for producing a hologram memory for general picture information.

SUMMARY OF THE INVENTION

The present invention is characterized in that in order to solve the above problems, an apparatus for producing a hologram comrpises a coherent light source, means for directing to a picture information imparting device at least part of a light beam emerging from the coherent light source, and means for projecting onto a photosensitive medium a light beam which has been transmitted through or reflected from the information imparting device and for simultaneously projecting onto the photosensitive medium a light beam which can interfere with the transmitted or reflected light beam, so as to cause both the projected light beams to interfere with each other. There is also provided means to divide the light beam transmitted through or reflected from the information imparting device into a plurality of smaller light beams.

BRIEF DESCRIPTION OF THE DRAWINGS

FIG. 1*a* is an explanatory diagram showing an embodiment of the present invention, while

DESCRIPTION OF THE PREFERRED EMBODIMENTS

Figure 1A:
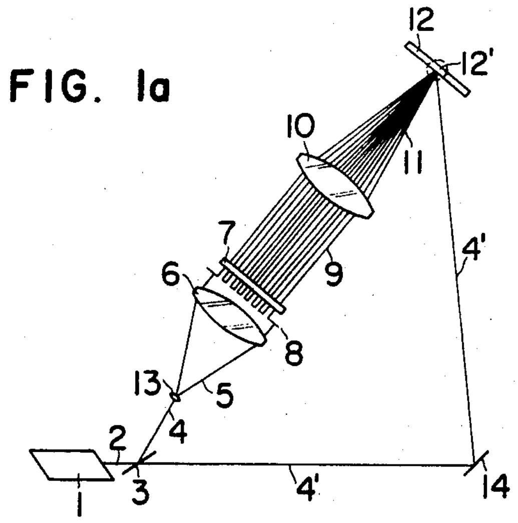

FIG. 1*a* shows an embodiment of the present invention. A laser beam 2 emerging from a laser light source 1 is split into an object beam 4 and a reference beam 4' by a beam splitter 3. The object beam 4 is magnified by a lens for magnification 13, into a magnified light beam 5. It is converted into a collimated light beam by a collimator lens 6, and falls on an information imparting device 7, for modulating the object beam 4 (the device 7, per se, is well known). A screen 8 with a two-dimensional grating (or a plate with apertures, hereinbelow generically termed a perforated plate) for dividing the light beam into a number of smaller light beams is arranged in front of (upstream) or at the back (downstream) of the information imparting device 7. Illustrated in the figure is a perforated plate 8 arranged in front of the information imparting device 7. As the information imparting device 7, there may be used, for example, a film on which a picture is recorded.

The light beam passing through the information imparting device 7 and the perforated plate 8 is converted into a group of smaller light beams 9 which contain the sampling information of picture information imparted by the information imparting device. The group of discrete smaller light beams 9 which do not overlap each other is focused by an information writing-in lens 10 into light beams 11. The beams project the Fourier transformation pattern of the sampling pattern of the picture information onto a photosensitive medium 12.

On the other hand, the reference beam 4' is directed to the recording medium 12 by a reflecting mirror 14. Interference fringes between it and the focused light beams 11 are produced to obtain a hologram 12'.

Figure 1B:
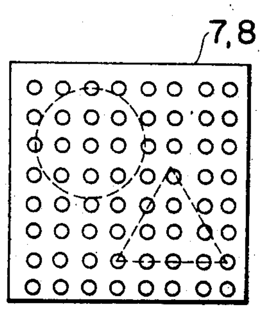
FIG. 1*b* is an explanatory diagram showing an arrangement in which picture information is sampled by a perforated plate provided with a number of circular apertures in the form of a matrix.

FIG. 1*b* is an explanatory view showing an arrangement in which picture information from the information imparting device 7 is sampled by the perforated plate 8. By way of example, the perforated plate 8 is provided with a number of circular apertures disposed regularly in the form of a matrix.

The hologram made in this manner differs from the conventional hologram in that only the light which has passed through parts of the picture information reaches the storage plane, namely, the hologram plane and in that the light beams, in fact, correspond to the sampling of the information of the entire picture. In that sense, the quantity of information itself is made smaller than by the prior-art method. According to the present invention, however, the foregoing difficulty of the Fourier transformation hologram is eliminated, and an effect as explained below is attained.

As previously described, spacial frequency components constituting picture information are distributed extremely widely from a high frequency $f_h$ (lines/mm) at the limit of the resolution of the naked eye to a zero frequency or a low frequency $f_l$ close thereto — in the case of an entire white area as in white paper. Moreover, the distributed state is quite indefinite.

When, irrespective of the frequency components of the picture, the mean diameter $2a$ (mm) of the apertures of the perforated plate is set at a value substantially equal to or slightly larger than the thickness of a line corresponding to the limit of the resolution of $1/f_h$, then the entire picture information has spacial frequencies forcibly widened to a range of $0 - a/1.22F\lambda$ (lines/mm). Here, $F$ denotes the focal length of the lens for subjecting the light having been transmitted through the picture information to the Fourier transformation onto the spacial frequency spectrum plane (hologram plane).

It is known that the energy distribution of diffracted light from a circular aperture of the diameter $2a$ exhibits a substantially Gaussian distribution within a so-called airy disc of a diameter of $2.44\ F\lambda/a$ (mm) on the frequency spectrum plane. The principle is herein utilized. Thus, bright spots in the form of sharp spectra which are generated at the center at the optical axis, as in the prior art, are eliminated. This will now be further explained in numerical values.

Consider a case where the size of the information imparting device 7 is approximately 200 mm x 200 mm, and where light passing therethrough and having a wavelength of 0.5 $\mu$ is Fourier-transformed by a lens having a focal length of 400 mm. For picture inputs, various forms may be used. For a picture constructed of gradually-changing densities over substantially the entire area, unless the aforesaid perforated plate 8 is employed, sharp energy will be concentrated on an area of a diameter of about 2 $\mu$ on the hologram plane, and a bright spot will appear thereat.

Not all pictures, however, have this characteristic. Minute information is sometimes included. The extent of the resolution 0.2 mm of the naked eye in the range of clear vision sometimes causes a problem. Information in that case spreads over an area of a diameter of about 2 mm even with the same optical system. A problem is that the picture information is extremely dispersed in this manner.

It is usually impossible to always make the sizes of holograms larger or smaller in dependence on the property of pictures. In the above case, therefore, all the diameters must be about 2 mm. For this reason, when the energy of information in the form of a sharp spectrum is concentrated on a very small part within the hologram medium, the diffraction efficiency of the hologram is conspicuously lowered. Simultaneously therewith, the saturation of the photosensitive medium is locally brought forth, which leads to a degradation of the picture quality.

In accordance with the present invention, using a perforated plate in which about 250,000 circular apertures, each having a diameter **2*a*** of 0.2 mm, are provided, information is sampled. Thus, information formed on the hologram plane by the lens for Fourier transformation is distributed within a diameter of approximately 2 mm by the use of the same optical system as in the aforesaid case and irrespective of the construction of the picture information. The lowering in the diffraction efficiency, the degradation in the quality of reconstructed pictures, etc., are prevented in the reconstructed of holograms.

In accordance with the present invention, the effect is further enhanced by various means as will be explained hereunder. The first means relates to the mode of the distribution of the apertures in the perforated plate.

Figure 2:
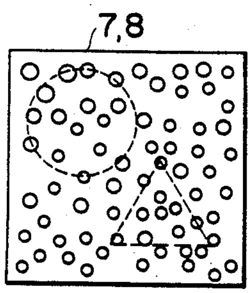
FIG. 2 is an explanatory view showing an arrangement in which picture information is sampled by a perforated plate having a number of circular apertures arranged at random therein.

It has heretofore been known that, when a plurality of apertures are regularly distributed in the form of a matrix, a spacial frequency component of $(n-1)\,F\lambda/P$ (where $P$ denotes the pitch or spacing of the matrix, and $n$ a positive integer) is emphasized on the spectrum plane. In order to avoid the local concentration of energy on such spacial frequency component, it is effective that, although the mean spacing of the array of the apertures is $P$, the individual spacings are random to such an extent as to cause no overlap of the circular apertures. FIG. 2 is an illustrative diagram showing the perforated plate 8 in which a number of small openings are arranged at random in this manner, and the information imparting device 7 wherein information is sampled by the perforated plate 8.

As the second means, a device is provided which adds random phases to a plurality of smaller light beams obtained by the sampling of the picture information, the random phases being respectively substantially constant across a beam and being independent of the array of the respective apertures. This is effective in order to avoid the phenomenon in which, as previously stated, the energy of the spacial frequency component is locally concentrated in the range of $(n-1)$ $F\lambda/P$.

Figure 3:
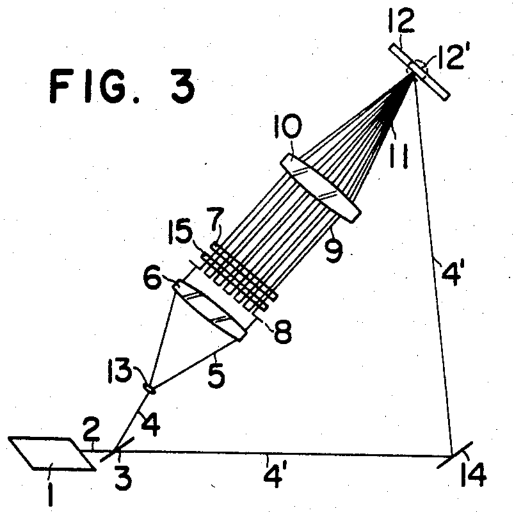
FIG. 3 is an explanatory diagram showing another embodiment of the present invention.
Figures 4A, 4B:
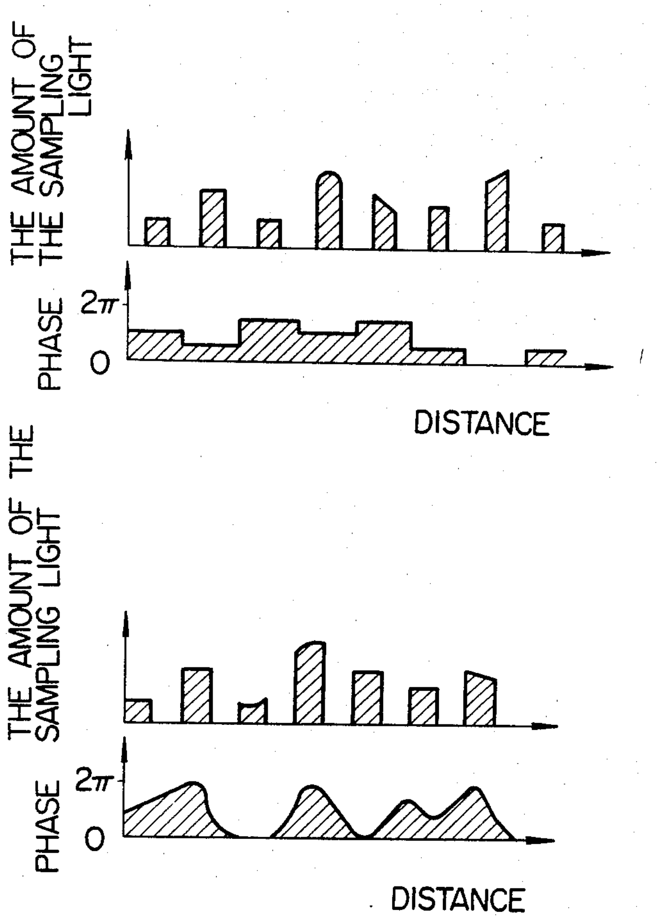
FIGS. 4*a* and 4*b* are explanatory diagrams each showing the relationship between a phase plate producing a random phase and information sampling beam.

FIG. 3 shows an embodiment providing this effect. It is constructed such that the apparatus in FIG. 1 is further provided with a phase plate 15 for imparting random phase shifts to the beams. The relationship between the phase added in this case and the quantity of sampling light is illustrated in FIG. **4*a*.**

As the third means, a plurality of smaller light beams obtained by sampling the picture information are caused to pass through a phase plate which gives rise to gradual random phase changes in two dimensions. Although, in this case, fixed phases are not always added to the respective smaller light beams, the measure is similarly effective in order to avoid the aforesaid local concentration of the energy of the spacial frequency component in the range of $(n-1)\,F\lambda/P$.

FIG. **4*b*** shows, by a sectional view, the relationship between the sampling of the information in this case and the phases added.

Figure 5:
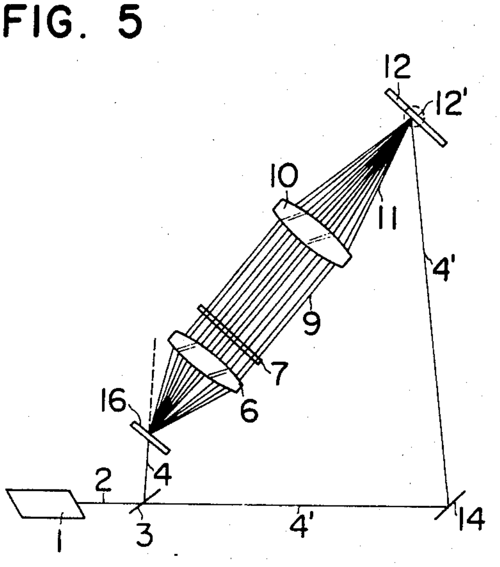
FIG. 5 is an explanatory diagram showing an embodiment which employs a divided divergent light beam-generating device.

As the fourth means, the sampling of the picture information is carried out by a device which generates divided divergent light beams. FIG. 5 shows an embodiment with the measure taken. It employs such divided divergent light beam-generating device 16 which is made up of an illumination hologram or Kinoform having hitherto been well known.

Referring to FIG. 5, the laser beam 2 is separated into an object light beam 4 and a reference light beam 4' by the beam splitter 3. The object beam 4 is converted into divergent light beams by the divided divergent light beamgenerator device 16, the split divergent light beams are made collimated light beams by the collimator lens 6, the collimated light beams permeate through the information imparting device 7, the permeating light beams are focused by the information writing-in lens 10, and the focused light beams 11 are projected on the photosensitive medium 12. On the other hand, the reference beam 4' is directed to the photosensitive medium 12 by the reflector 14. Interference takes place between the object beam and the reference beam and interference fringes are recorded on the photosensitive medium. Thus, the hologram 12' is produced.

FIG. **6*a* is an explanatory diagram in the case where the divided divergent light beam-generator device 16 for use in the embodiment in FIG. 5 is constructed of the illumination hologram, by way of example. The group of smaller light beams obtained through the perforated plate 8, as is illustrated in FIG. 1, are focused by a lens 17. The focused light beams are projected on a photosensitive medium 18. A reference light beam 19 is superposed herein. An illumination hologram 18'** is thus formed as interference fringes.

Figure 6A:
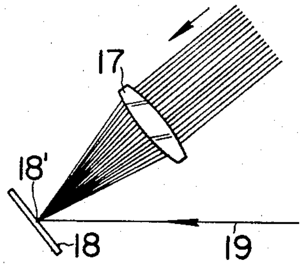
FIGS. 6*a* and 6*b* are explanatory diagrams each illustrating a method of making the divided divergent light beam-generating device.
Figure 6B:
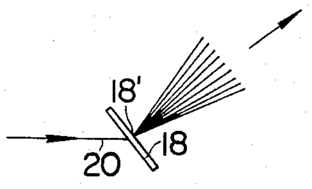

As shown in FIG. **6*b*, the illumination hologram 18' obtained in this manner is illuminated by an information reconstructing light beam 20 being incident from the opposite side to the reference ray 19 in FIG. 6*a*. Then, light waves opposite to the group of smaller light beams arise, to form the image of the circular apertures of the perforated plate used at the preparation of the hologram. Therefore, when the picture information imparting device is arranged at the position of the image formation, the information is illuminated by the group of divided smaller light beams. That is to say, in this case, the illumination hologram 18' is used as the divided divergent light beam-generator device 16 in FIG. 5. In accordance with this method, a loss in the quantity of light due to the sampling is advantageously made small by selecting the efficiency of the divided divergent light beam-generator device to be sufficiently high. In addition, a divided divergent light beam-generator device containing random phases can be produced in such a way that the perforated plate 8 and the phase plate 15 shown in FIG. 3** and adapted to add the random phases are placed on each other at the preparation of the hologram. This is effective in simplifying the whole construction of the apparatus.

As the fifth means, the sampling proportion (percentage) at which the sampling of the picture information is made is selcted. The expression "sampling proportion" is intended to mean a value which is obtained by dividing the total area of the picture by the whole sampled and extracted area. When the value is excessively small, an image without a considerable amount of original information is reconstructed. On the other hand, when it is excessively large, the interference between reconstructed sampling information occurs, and it is possible that unpreferable noise such as the speckling effect will occur. The best result is obtainable by selecting the sampling proportion at 10 to 60 percent.

The term "picture," to which the present invention is directed, covers all pictures with which we are daily familiar in movies and television. In some cases, a part or the whole of such a picture includes a character, letter, numeral, digital code, etc. Color pictures are naturally covered. In case of a color picture, the laser light source 1 in FIG. 1, 3 or 5 may be constructed of a set of laser light source means which generate the three primary colors of red, green and blue at the same time or separately in time. In the case of producing holograms of red, green and blue separately in time, the perforated plate 8 for the sampling of the information as shown in FIG. 1 is moved during the three exposure periods for red, green and blue, or it is replaced with another, whereby an area at which quite no information is sampled from within one picture can be decreased to the utmost.

While, in the above description, the film has been exemplified as the information imparting device, it is also possible to employ a spacial modulator which constitutes information by the combination between, for example, electric signals and an electro-optical crystal. While the light beams containing the sampling information have been described as passing through the information imparting device, reflected light from the information imparting device can also be employed as such. As an example, there is a case where information is depicted on a reflector by black lines. While, in the previous embodiments, the small openings of the perforated plate have been described as being circular, they can be formed into a variety of shapes.

As described in detail above, the reconstructed picture quality and the reconstruction efficiency of holograms can be remarkably enhanced by the present invention. The effects of the present invention on them are marked. As an example, with respect to reconstructed picture quality, holograms quite indistinguishable on account of the mixing of noises were improved to the extent of the usual television pictures by applying the present invention thereto. On the other hand, the reconstruction efficiency was enhanced to the extent by a factor of 3 to 5. The invention is greatly effective as a hologram producing apparatus.

What is claimed is:

1. A hologram producing apparatus comprising:

a source of coherent light;

first means for separating said coherent light into an object beam and a reference beam, respectively, along different optical paths;

second means for modulating said object beam in accordance with prescribed picture information;

a photosensitive recording medium;

third means for causing said object beam emanating from said second means to form an optical Fourier transform of said picture information on said recording medium;

fourth means, disposed at a predetermined location in the path of said reference beam, for transmitting said reference beam to said recording medium;

fifth means, disposed at a predetermined location in the path of said object beam, for collimating said object beam; and sixth means, disposed in the path of said collimated object beam, for dividing said collimated object beam into a plurality of discrete smaller rays which do not overlap each other, including plate means having a plurality of apertures therethrough disposed in a two-dimensional array, said apertures being of a size such that substantially no diffraction of said object beam occurs thereby;

whereby a hologram is produced on said recording medium as an interference pattern formed by said plurality of smaller rays of said object beam and said reference beam.

2. The hologram producing apparatus according to claim 1, wherein said apertures of said plate means are arranged at random.

3. The hologram producing apparatus according to claim 1, further comprising a device which shifts the phases of said plurality of divided smaller rays at random and uniformly irrespective of the array among the respective smaller rays.

4. The hologram producing apparatus according to claim 1, wherein said plate means is so constructed that the sum of the areas of said plurality of apertures is from 10 to 60 percent with respect to the area of the entirety of said picture information.

5. The hologram producing apparatus according to claim 1, wherein said plate means is so constructed that the mean diameter of the apertures is substantially equal to the value of a resolution as required for reconstruction of said picture information.

6. A hologram producing apparatus comprising:

a source of coherent light;

first means for separating said coherent light into an object beam and a reference beam, respectively, along different optical paths;

second means for modulating said object beam in accordance with prescribed picture information;

third means, disposed at a predetermined location in the optical path between said first means and said second means, for generating divided divergent rays upon the impingement of said object beam thereon;

a photosensitive recording medium;

fourth means for causing said object beam emanating from said second means to form an optical Fourier transform of said picture information on siad photosensitive recording medium;

fifth means, disposed at a predetermined location in the optical path between said second means and said third means, for collimating said divided divergent rays into a plurality of discrete rays travelling along discrete paths, so that said plurality of discrete rays do not overlap each other and are not substantially diffracted and are thereby prevented from interfering with each other, each of which is modulated by said second means; and sixth means, disposed at a predetermined location in the path of said reference beam, for transmitting said reference beam to said photosensitive recording medium;

whereby a hologram is produced in said recording medium as an interference pattern formed by said plurality of discrete rays of said object beam and said reference beam.

7. A hologram producing apparatus comprising:

a source of coherent light;

first means, receiving the light from said source, for separating said light into a reference beam and an object beam, respectively, along different optical paths;

second means, disposed in the path of said object beam, for separating said object beam into a plurality of individual beams each of which is collimated and travels along a discrete path separate from the discrete paths of the other collimated beams of said plurality, so that said plurality of collimated beams do not overlap each other and are not substantially diffracted and are thereby prevented from interfering with each other;

third means for modulating each of said collimated beams with prescribed picture information;

fourth means, receiving said modulated collimated beams, for causing said collimated beams to form an optical Fourier transform of said picture information at a prescribed location in the path of said object beam; and fifth means, disposed at said prescribed location in the path of said reference beam, for recording the image formed by the interference of said reference beam and said optical Fourier transform of said picture information thereat.

8. A hologram producing apparatus according to claim 7, wherein said second means comprises a collimating lens and a perforated plate having a plurality of apertures arranged therethrough in a two-dimensional array, said apertures being of a size such that substantially no diffraction of said object beam occurs thereby.

9. A hologram producing apparatus according to claim 8, wherein said apertures are circularly shaped and are distributed across said plate in a random fashion.

10. A hologram producing apparatus according to claim 9, further including seventh means, disposed in the respective paths of said collimated beams, for randomly shifting the phase of each respective collimated beam by an amount which is substantially constant across each beam.

11. A hologram producing apparatus according to claim 7, wherein said second means comprises means, disposed at a predetermined location in the optical path between said first means and said third means, for generating divided divergent rays upon the impingement of said object beam thereon, and a collimating lens for collimating said divided divergent rays into said plurality of individual beams travelling along discrete paths which do not overlap each other.

12. A hologram producing apparatus according to claim 11, wherein said means for generating divided divergent rays comprises an illumination hologram.

13. A hologram producing apparatus according to claim 11, wherein said means for generating divided divergent rays includes a random phase illumination hologram, disposed in the path of said object beam from said first means, for producing a plurality of discrete and separate divergent beams travelling along paths randomly distributed with respect to each other, the phase of each divergent beam being substantially constant across the beam and being randomly shifted with respect to the phases of the other divergent beams.

* * * * *